United States Patent
Martin et al.

(10) Patent No.: US 11,286,783 B2
(45) Date of Patent: Mar. 29, 2022

(54) AIRFOIL WITH CMC LINER AND MULTI-PIECE MONOLITHIC CERAMIC SHELL

(71) Applicant: Raytheon Technologies Corporation, Farmington, CT (US)

(72) Inventors: Thomas J. Martin, East Hampton, CT (US); John E. Holowczak, South Windsor, CT (US); Matthew B. Kennedy, Vernon, CT (US); Paul F. Croteau, Columbia, CT (US); Paul Attridge, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/859,198

(22) Filed: Apr. 27, 2020

(65) Prior Publication Data
US 2021/0332705 A1 Oct. 28, 2021

(51) Int. Cl.
*F01D 5/14* (2006.01)
*F01D 5/28* (2006.01)

(52) U.S. Cl.
CPC ............ *F01D 5/147* (2013.01); *F01D 5/282* (2013.01); *F01D 5/284* (2013.01); *F05D 2300/6033* (2013.01)

(58) Field of Classification Search
CPC .......... F01D 5/147; F01D 5/282; F01D 5/284
See application file for complete search history.

(56) References Cited

U.S. PATENT DOCUMENTS

| | | | |
|---|---|---|---|
| 2,220,420 A * | 11/1940 | Meyer | F01D 5/186 416/90 R |
| 2,585,871 A * | 2/1952 | Stalker | F01D 5/186 416/90 R |

(Continued)

FOREIGN PATENT DOCUMENTS

| | | |
|---|---|---|
| EP | 0330601 | 8/1989 |
| EP | 2500548 | 9/2012 |

OTHER PUBLICATIONS

Holowczak, et al., "Hybrid Monolithic Ceramic/Ceramic Matrix Composites; from Turbine Airfoils to Armor", presented at the 35 Annual International Conference & Exposition on Advanced Ceramics & Composites (ICACC), Jan. 26, 2011, A. Cer. S., Daytona Beach, Fl., Jan. 2011.

(Continued)

*Primary Examiner* — Woody A Lee, Jr.
*Assistant Examiner* — Behnoush Haghighian
(74) *Attorney, Agent, or Firm* — Carlson, Gaskey & Olds, P.C.

(57) ABSTRACT

An airfoil includes an airfoil section that has an airfoil wall that surrounds a cavity. The airfoil wall includes an exterior monolithic ceramic shell and an interior CMC liner that has CMC plies. An outermost ply of the CMC plies forms tabs that are raised from an underlying ply so as to define a slot. The exterior monolithic ceramic shell includes an underlapping shell piece and an overlapping shell piece. The underlapping shell piece has a portion disposed in the slot and bonded with the tabs. The overlapping shell piece extends over the tabs and is bonded to the tabs. There are channels bounded by adjacent ones of the tabs, the underlapping shell piece, and the overlapping shell piece. Channel orifices through the CMC liner connect the cavity and the channels.

19 Claims, 4 Drawing Sheets

(56) References Cited

U.S. PATENT DOCUMENTS

| | | | | |
|---|---|---|---|---|
| 3,533,711 | A * | 10/1970 | Kercher | F01D 5/187 416/90 R |
| 3,619,077 | A * | 11/1971 | Wile | F01D 5/18 415/115 |
| 4,026,659 | A * | 5/1977 | Freeman, Jr. | F01D 5/186 415/115 |
| 4,565,490 | A * | 1/1986 | Rice | F02C 7/16 415/114 |
| 4,859,147 | A * | 8/1989 | Hall | F01D 5/186 416/97 R |
| 5,827,045 | A * | 10/1998 | Beeck | F01D 5/284 416/96 A |
| 6,013,592 | A * | 1/2000 | Merrill | C04B 28/34 501/103 |
| 6,200,092 | B1 * | 3/2001 | Koschier | F01D 5/146 415/191 |
| 6,451,416 | B1 | 9/2002 | Holowczak et al. | |
| 6,543,996 | B2 * | 4/2003 | Koschier | F01D 5/187 415/200 |
| 6,696,144 | B2 | 2/2004 | Holowczak et al. | |
| 7,011,502 | B2 * | 3/2006 | Lee | F01D 5/187 416/97 R |
| 7,056,093 | B2 * | 6/2006 | Self | F01D 5/186 416/97 R |
| 7,066,717 | B2 * | 6/2006 | Morrison | F01D 5/187 29/889.71 |
| 7,273,351 | B2 * | 9/2007 | Kopmels | F01D 5/186 416/97 R |
| 7,316,539 | B2 * | 1/2008 | Campbell | F01D 5/146 244/123.1 |
| 7,393,183 | B2 * | 7/2008 | Keller | F01D 5/147 416/223 A |
| 8,105,030 | B2 * | 1/2012 | Abdel-Messeh | F01D 5/187 416/95 |
| 8,109,725 | B2 * | 2/2012 | Abdel-Messeh | F01D 5/14 416/96 R |
| 8,197,211 | B1 * | 6/2012 | Liang | F01D 5/282 416/97 R |
| 8,939,728 | B2 | 1/2015 | McCaffrey et al. | |
| 10,309,226 | B2 * | 6/2019 | Surace | F01D 25/12 |
| 10,470,061 | B2 | 9/2019 | Freeman et al. | |
| 10,436,049 | B2 * | 10/2019 | Propheter-Hinckley | F01D 5/189 |
| 10,544,689 | B2 | 1/2020 | Borto et al. | |
| 10,577,942 | B2 * | 3/2020 | Dyson | F01D 9/065 |
| 2005/0238491 | A1 * | 10/2005 | Morrison | F01D 5/282 416/229 R |
| 2006/0285973 | A1 * | 12/2006 | Keller | F01D 5/147 416/97 R |
| 2010/0054930 | A1 | 3/2010 | Morrison | |
| 2010/0068069 | A1 * | 3/2010 | Ahmad | F01D 5/186 416/97 R |
| 2018/0135417 | A1 * | 5/2018 | Surace | F01D 5/288 |
| 2018/0135423 | A1 * | 5/2018 | Dyson | F01D 9/065 |
| 2018/0135427 | A1 * | 5/2018 | Surace | F04D 29/541 |
| 2018/0135447 | A1 * | 5/2018 | Propheter-Hinckley | F01D 9/042 |
| 2019/0283271 | A1 | 9/2019 | Tsuru et al. | |
| 2020/0032665 | A1 * | 1/2020 | Propheter-Hinckley | F02C 3/04 |

OTHER PUBLICATIONS

European Search Report for European Patent Application No. 21170729.4 dated Nov. 11, 2021.

* cited by examiner

ND MULTI-PIECE MONOLITHIC CERAMIC
AIRFOIL WITH CMC LINER AND MULTI-PIECE MONOLITHIC CERAMIC SHELL

STATEMENT REGARDING FEDERALLY SPONSORED RESEARCH OR DEVELOPMENT

This invention was made with government support under U.S. Government contract No. DE-FE0031622 awarded by the Department of Energy. The Government has certain rights in this invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes an airfoil section that has an airfoil wall surrounding a cavity. The airfoil wall includes an exterior monolithic ceramic shell and an interior ceramic matrix composite (CMC) liner. The CMC liner includes CMC plies, and an outermost ply of the CMC plies forms tabs that are raised from an underlying ply of the CMC plies so as to define a slot between the tabs and the underlying ply. The exterior monolithic ceramic shell includes an underlapping shell piece and an overlapping shell piece. The underlapping shell piece has a portion disposed in the slot and bonded with the tabs. The overlapping shell piece extends over the tabs and is bonded to the tabs. Channels are bounded by adjacent ones of the tabs, the underlapping shell piece, and the overlapping shell piece. Channel orifices through the CMC liner connect the cavity and the channels.

In a further embodiment of any of the foregoing embodiments, the overlapping shell piece includes a base portion and a tapered flange that projects from the base portion, and the tapered flange is bonded with the tabs.

In a further embodiment of any of the foregoing embodiments, the base portion is bonded with the outermost ply adjacent to the tabs.

In a further embodiment of any of the foregoing embodiments, the underlapping shell piece includes a base portion and a tapered flange that projects from the base portion, and the tapered flange is bonded with the tabs.

In a further embodiment of any of the foregoing embodiments, the base portion is bonded with the CMC liner.

In a further embodiment of any of the foregoing embodiments, the overlapping shell piece and the underlapping shell piece each include a base portion and a tapered flange that projects from the base portion. The tapered flange of the underlapping shell piece is bonded with an inner surface of the tabs, and the tapered flange of the overlapping shell piece is bonded with an outer surface of the tabs.

In a further embodiment of any of the foregoing embodiments, the tabs are axially elongated.

In a further embodiment of any of the foregoing embodiments, the tabs are arranged in a radial row.

In a further embodiment of any of the foregoing embodiments, the channels each have a sloped outlet section.

In a further embodiment of any of the foregoing embodiments, the overlapping shell piece is a first overlapping shell piece. The monolithic ceramic shell includes a second, adjacent overlapping shell piece. The first overlapping shell piece has a first side edge. The second overlapping shell piece has a second side edge. The first and second side edges define sides of an elongated trench. The CMC liner defines a floor of the trench, and the floor includes trench orifices through the CMC liner connecting the cavity and the trench.

An airfoil according to an example of the present disclosure includes an airfoil section that has an airfoil wall surrounding a cavity. The airfoil wall includes an exterior monolithic ceramic shell and an interior ceramic matrix composite (CMC) liner. The CMC liner includes CMC plies, and an outermost ply of the CMC plies forms a tab that is raised from an underlying ply of the CMC plies. The exterior monolithic ceramic shell includes shell pieces with respective flanges that overlap each other with the tab being situated between the flanges. The tab is bonded with the flanges so as to secure the flanges together.

In a further embodiment of any of the foregoing embodiments, the tab includes a base portion that projects outwards from the underlying ply and a body portion that projects off of the base portion along the underlying ply.

In a further embodiment of any of the foregoing embodiments, the tab includes a tip portion that projects off of the body portion away from the underlying ply.

In a further embodiment of any of the foregoing embodiments, the tab is a single one of the CMC plies.

An airfoil according to an example of the present disclosure includes an airfoil section that has an airfoil wall surrounding a cavity. The airfoil wall includes an exterior monolithic ceramic shell and an interior ceramic matrix composite (CMC) liner bonded with the exterior monolithic ceramic shell. The exterior monolithic ceramic shell includes a first shell piece having a first side edge and a second shell piece having a second side edge. The first and second side edges define sides of an elongated trench and the CMC liner defining a floor of the trench. The floor includes a plurality of orifices through the CMC liner connecting the cavity and the trench.

In a further embodiment of any of the foregoing embodiments, at least the first side edge defines an exterior sloped lip of the trench.

In a further embodiment of any of the foregoing embodiments, at least a portion of the orifices are sloped radially outwards.

In a further embodiment of any of the foregoing embodiments, the trench is radially elongated.

In a further embodiment of any of the foregoing embodiments, the CMC liner includes CMC plies. An outermost ply of the CMC plies forms tabs that are raised from an underlying ply of the CMC plies so as to define a slot between the tabs and the underlying ply. The exterior monolithic ceramic shell includes an underlapping shell piece that has a portion disposed in the slot and that is bonded with the tabs, and the first shell piece extends over the tabs and is bonded to the tabs.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
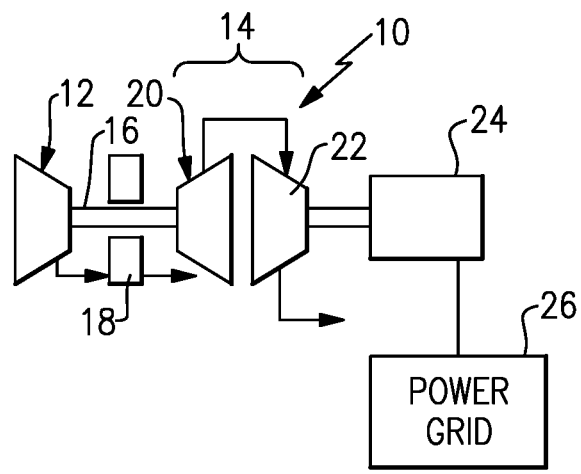
FIG. 1 illustrates an example gas turbine engine.

FIG. 1 schematically illustrates a gas turbine engine 10. The engine 10 includes a compressor section 12 and a turbine section 14 interconnected by a shaft 16. A combustor 18 is arranged between the compressor and turbine sections 12/14. The turbine section 14 includes first and second turbines 20/22, which correspond to high and low pressure turbines, respectively. A generator 24 is rotationally driven by a shaft coupled to the low pressure turbine 22, or power turbine. The generator 24 provides electricity to a power grid 26. It should be understood that the illustrated engine 10 is highly schematic, and may vary from the configuration illustrated. Moreover, the examples herein are not limited to industrial turbines and may be used in propulsion gas turbine engines.

Figure 2:
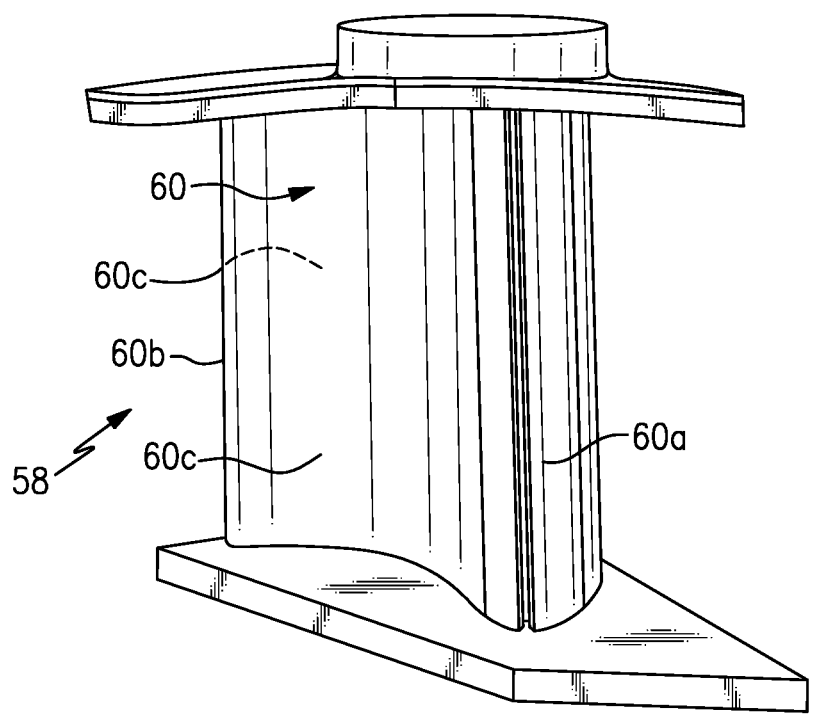
FIG. 2 illustrates a perspective view of an airfoil.
Figure 3:
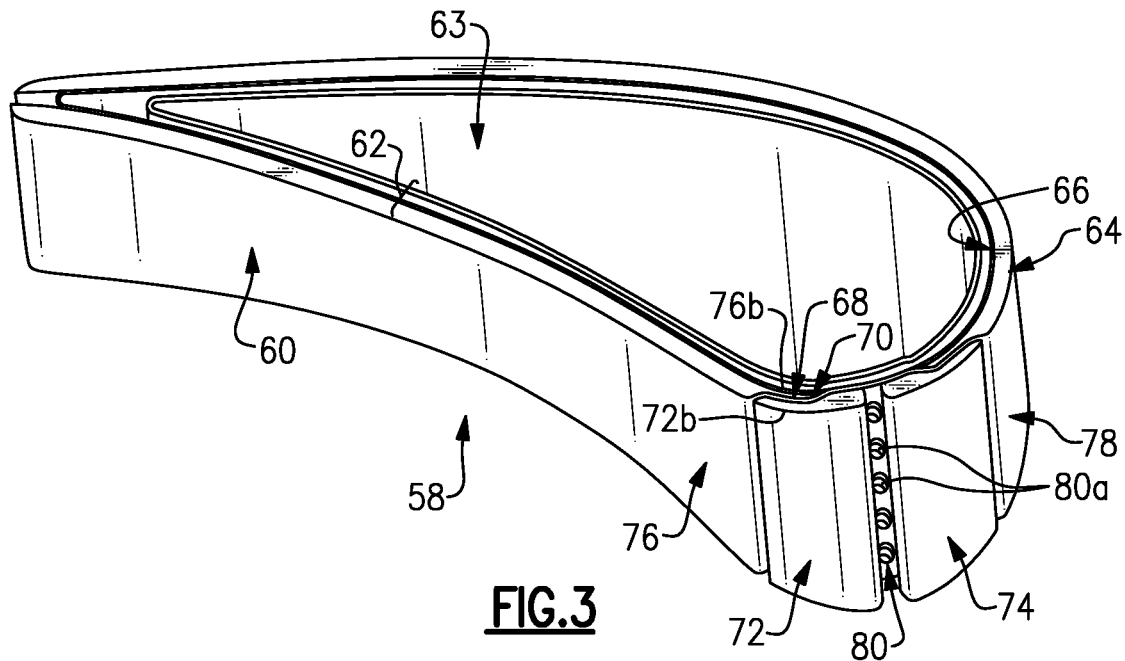
FIG. 3 illustrates a sectioned view of the airfoil.

FIG. 2 illustrates an isolated view of an airfoil 58 that demonstrates several aspects of the present disclosure, and FIG. 3 illustrates a sectioned view of the airfoil 58. As will be appreciated, the airfoil 58 is from the turbine section 14 of the engine 10. Although the airfoil 58 is depicted as a stationary turbine vane that has radially inner and outer endwalls, it is to be understood that the airfoil 58 may alternatively be a rotating blade. As used herein, directional terms such as "axial," "radial," and the like are taken with regard to the rotational axis of the engine 10, which is generally coaxial with the shaft 16.

The airfoil 58 is generally comprised of an airfoil section 60 that defines a leading edge 60a, a trailing edge 60b, a first or pressure side 60c, and a second or suction side 60d. The terminology "first" and "second" as used herein is to differentiate that there are two architecturally distinct components or features. It is to be further understood that the terms "first" and "second" are interchangeable in the embodiments herein in that a first component or feature could alternatively be termed as a second component or feature, and vice versa.

Referring to FIG. 3, the airfoil section 60 is formed of an airfoil wall 62 that surrounds a core cavity 63. In this example, the airfoil section 60 includes a single cavity, although multiple cavities that are divided by ribs or other structures are also contemplated. The core cavity 63 is connected to a cooling air source, such as bleed air from the compressor 12, which provides relatively cool air into the core cavity 63 for cooling the airfoil 58.

The airfoil wall 62 includes an exterior monolithic ceramic shell 64 (hereafter "shell 64") and an interior ceramic matrix composite liner 66 (hereafter "liner 66") that lines, and is bonded to, the interior surfaces of the shell 64.

Generally the shell 64 facilitates providing good high temperature resistance and stability against oxidation, corrosion, erosion (recession), and compressive strength, and the liner 66 facilitates providing good tensile strength, and creep resistance. The combined shell and liner provide superior impact resistance.

The shell 64 may be, but is not limited to, silicon carbide (SiC), silicon nitride ($Si_3N_4$), alumina ($Al_2O_3$), silicon aluminum oxynitride (SiAlON), nitride bonded silicon carbide (NBSC), aluminum nitride (AlN), silicon oxynitride ($Si_2N_2O$), hafnia ($HfO_2$), zirconia ($ZrO_2$), or other oxides, carbides, or nitrides, and particulate composites thereof. In some examples, the shell 64 has a thickness from about 0.5 millimeters to about 0.8 millimeters.

The ceramic matrix composite of the liner 66 includes bundles of fibers called tows in the form of yarns that can be woven into plies or laid out on unidirectional tape and disposed in a ceramic matrix. The fibers within the CMC layers include fiber bundles woven into plies, like cloth, which are assembled into a fiber-reinforced preform which is later infiltrated with the ceramic matrix. Most typically, the fibers are ceramic fibers that are provided as a fiber network, such as woven plies, fibrous mats, and the like. The fibers may be, but are not limited to, non-oxide fibers such as SiC fibers or oxide fibers such as aluminosilicate fibers. The fibers may also be coated with boron nitride (BN) or other interface material to prevent bonding with the matrix.

The ceramic matrix of the liner 66 may be, but is not limited to, amorphous compounds of silicon, carbon, nitrogen, oxygen, boron, or other light elements. Example compounds include SiC, $Al_2O_3$, $Si_3N_4$, boron nitride (BN), SiAlON, AlN, magnesium aluminum silicate (MAS), lithium aluminum silicate, barium aluminum silicate (BAS), barium magnesium aluminum silicate (BMAS), and combinations thereof. Those skilled in the art will recognize that other matrices, including metalloids such as silicon or alloys thereof, could be employed.

Figure 4:
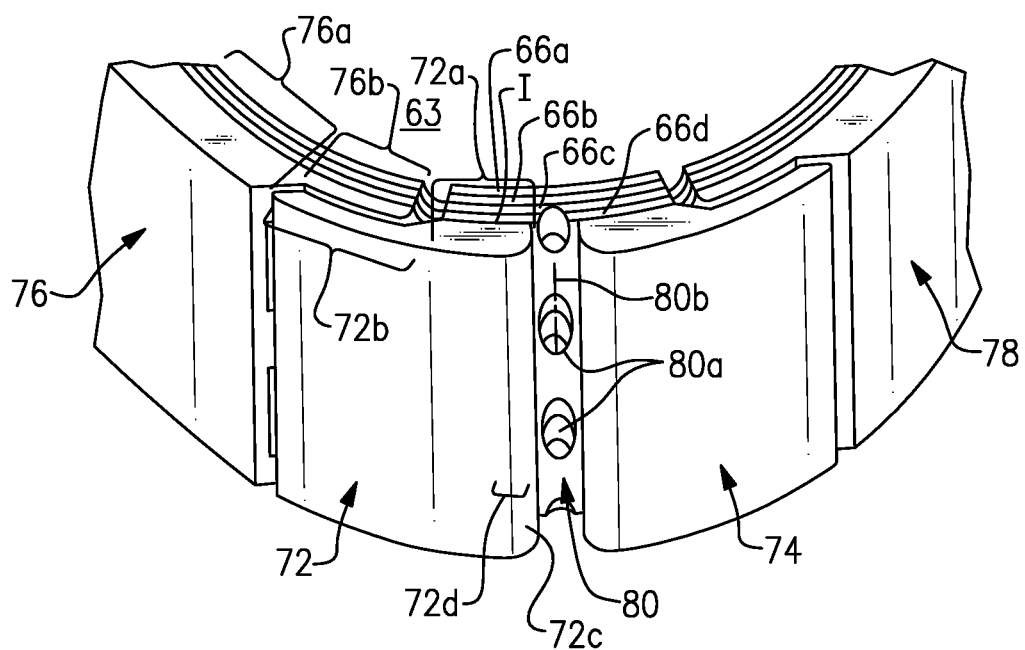
FIG. 4 illustrates a view of a leading edge region of the airfoil.

As shown in the view of the leading edge region in FIG. 4, the liner 66 includes four fiber plies 66a/66b/66c/66d, although additional fiber plies or fewer plies may alternatively be used. In the example depicted, the ply 66a is an innermost ply, the ply 66d is an outermost ply, the ply 66b is an inner intermediate ply, and the ply 66c is an outer intermediate ply. The plies 66a/66b/66c/66d are bonded together via the matrix of the CMC material.

Figure 5:
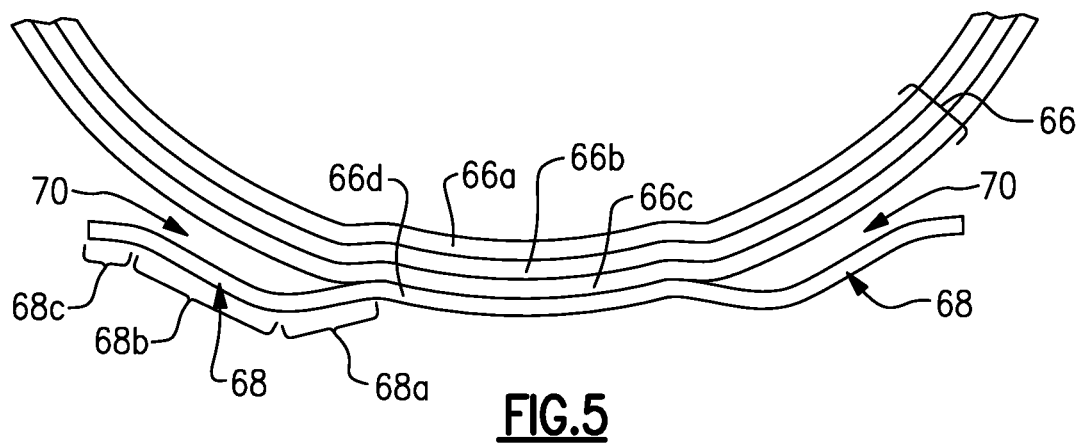
FIG. 5 illustrates an isolated view of a portion of a CMC liner.

FIG. 5 illustrates an isolated view of a portion of the liner 66 and plies 66a/66b/66c/66d. The ply 66d forms tabs 68 that are raised from the underlying ply 66c so as to define a slot 70 that allows for cooling air to pass between the tabs 68 and the underlying ply 66c. The tabs 68 in this example are formed from the single ply 66d and are thus one ply thick. The tabs 68 may alternatively be formed from two plies 66c/66d or more than two plies for additional strength.

Figure 6:
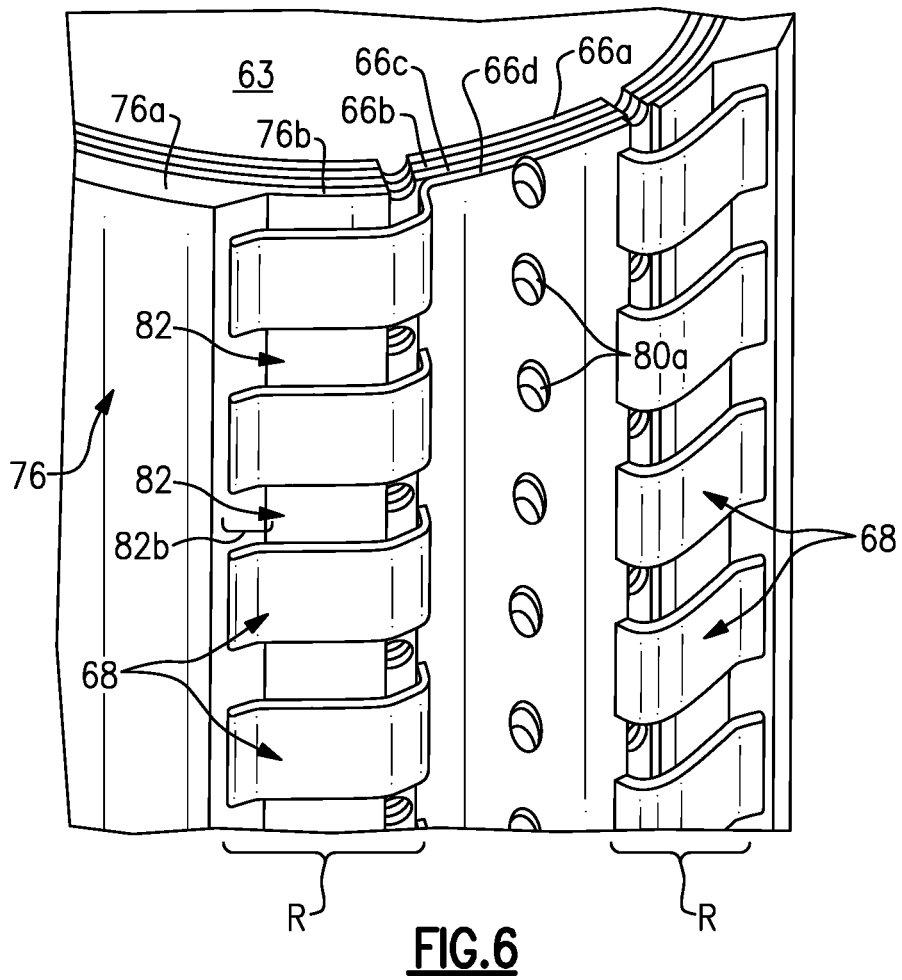
FIG. 6 illustrates a leading end region of an airfoil without a portion of a monolithic ceramic shell.

Each tab 68 is generally axially elongated and includes a base 68a that projects outwards, away from the underlying ply 66c and a body portion 68b that projects off of the base portion 68a. The body portion 68b extends along the underlying ply 66c such that the slot 70 has a relatively uniform width at the body portion 68b. For reasons which will be evident below, a tip portion 68c projects off of the body portion 68b in a direction away from the underlying ply 66c. The tabs 68 are generally spaced apart from one another and are arranged in radial rows (R), as depicted in FIG. 6 (FIG. 6 excludes a portion of the shell 64 so that the tabs 68 are visible). In the illustrated example, there are two rows (R) of tabs 68.

Turning again to FIG. 4, the shell 64 is made up of multiple distinct shell pieces, including a first shell piece 72, a second shell piece 74, a third shell piece 76, and a fourth shell piece 78. In this example, the first and second shell pieces 72/74 form the leading edge region, while the third shell piece 76 forms the pressure side and the fourth shell piece 78 forms the suction side. The multiple pieces may facilitate alleviating mechanical stresses and the thermal stress between different regions of the airfoil 58. Moreover, the shell pieces 72/74/76/78 are of relatively simple construction in that they do not contain any orifices, which facilitates reductions in thermal gradients and stress concentrations for enhanced damage tolerance.

The first shell piece 72 and the second shell piece 74 are of similar construction to each other and while the first shell piece 72 is described below, the second shell piece 74 is understood include the same features. The first shell piece 72 is formed of a body portion 72a and a tapered flange 72b that projects (axially) off of the body portion 72a. The body portion 72a is bonded to the outermost ply 66d at interface (I), as depicted in FIG. 3. In comparison to the tapered flange 72b, the body portion 72a is relatively thick. In the illustrated example, the body portion 72a and the flange 72b are radially elongated. The body portion 72a defines a side edge 72c that has an exterior sloped lip 72d.

The second shell piece 74 is located adjacent the first shell piece 72. Together, the side edges 72c of the shell pieces 72/74 form sides of a trench 80, with the outermost ply 66d of the liner 66 forming a floor of the trench 80. In that regard, the floor includes a plurality of trench orifices 80a through the liner 66 that connect the cavity 63 and the trench 80. At least a portion of the trench orifices 80a are sloped radially outwards, as indicated at 80b (FIG. 3). In the illustrated example, the trench 80 is located at the leading edge 60a of the airfoil section 60, however, it is to be understood that the trench 80 could alternatively or additionally be located on the pressure side, the suction side, or both.

The third shell piece 76 and the fourth shell piece 78 are of similar construction to each other and while the third shell piece 76 is described below, the fourth shell piece 78 is understood include the same features. The third shell piece 76 is formed of a body portion 76a and a tapered flange 76b that projects (axially) off of the body portion 76a. In comparison to the tapered flange 76b, the body portion 76a is relatively thick.

Figure 7:
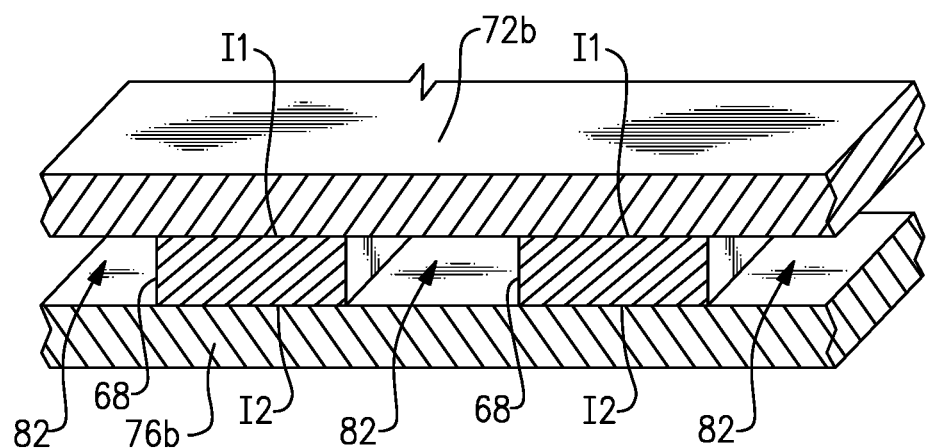
FIG. 7 illustrates a sectioned view through ribs in the wall of an airfoil.

As best shown in FIG. 3, the flange 76b of the third shell piece 76 is disposed in the slot 70 under the tabs 68. The first shell piece 72 overlies the outer ply 66d such that the flange 72b overlaps the tabs 68. The flanges 72b/76b thus overlap each other, with the tabs 68 situated there between to structurally support the flange 72b of the first shell piece 72 as well as to allow cooling air to pass between the shell pieces. In this regard, the third shell piece 76 is an underlapping shell piece and the first shell piece 72 is an overlapping shell piece. Similarly, the fourth shell piece 78 is an underlapping shell piece and the second shell piece 74 is an overlapping shell piece. As shown in a sectioned view in FIG. 7, the flange 72b of the first shell piece 72 is bonded to the top surface of the tabs 68 at interfaces (I1) and the flange 76b of the third shell piece 76 is bonded to the inside surface of the tabs 68 at interfaces (I2).

Channels 82 are bound by adjacent tabs 68 that serve as the channel sides and the flanges 72b/76b that serve as the respective channel top and bottom. As can be seen in FIG. 6, there are channel orifices 82a through the liner 66 that connect the channels 82 and the cavity 63. The channel orifices 82a serve as inlets for cooling air to flow into the channels 82. The channels 82 are axially elongated and generally extend from the channel orifices 82a to a channel outlet section 82b. The outlet section 82b is sloped relative to the surface of the third shell piece 76. The tip portions 68c of the tabs 68 abut and are bonded with the sloped surface portion of the third shell piece 76 adjacent the outlet section 82b. The slope of the outlet section 82b is generally shallow in order to discharge a film of cooling air along the outer surface of the third shell piece 76. In the example shown, the tabs 68 extend axially and are straight-sided, which forms the channels 82 to be axial and straight-sided. In another example, the tabs 68 taper in width along the body portion 68b, resulting in the channels 82 widening with further distance from the orifices 82a in order to diffuse cooling air flow. Additionally or alternatively, the tabs 68 are tapered in thickness, such that the channels 82 are also set back from the edge of the flanges 72b. In further examples, the tabs 68 can also have aerodynamic contours to facilitate cooling air flow and/or minimize mixing losses when the air is discharged for film cooling.

During operation of the engine 10 cooling air is provided into the core cavity 63. The cooling air flows through the trench orifices 80a and cools the side edges 72c of the shell pieces 72/74. The sloped lip 72d of the side edge 72c permits the cooling air to leak out of the trench 80 as a cooling film along the outer surface of the shell piece 72. The cooling air also flows through the channel orifices 82a into the channels 82. The cooling air flowing in the channels 82 cools the flanges 72b/76b and then may also be discharged as a cooling film along the outside of the shell piece 76.

The fabrication of the shell pieces 72/74/76/78 is not particularly limited and may be produced by slip casting, isostatic pressing and green machining, injection molding, or additive manufacturing, followed by densification. Densification techniques include, but are not limited to, sintering, hot isostatic pressing (HIP), sinter-HIPing, silicon infiltration and reaction bonding, and reaction bonding in combination with other techniques listed herein.

The fabrication of the liner 66 also is not particularly limited and may be produced using a fiber-reinforced preform and then infiltrating the preform with a ceramic matrix material or precursor to the ceramic matrix material. The infiltration may be conducted by any of a variety of methods, including but not limited to, chemical vapor infiltration (CVI), polymer infiltration and pyrolysis (PIP), transfer molding, and melt infiltration (MI). The shell 64 may be prefabricated using known ceramic processing techniques. The preform may be constructed in the desired geometry in the shell 64, in contact with the interior surfaces of the shell 64. For example, fiber plies are built-up to construct the walls of the liner 66. Upon densification of the ceramic matrix of the liner 66, due to the contact between the preform and the monolithic ceramic of the shell 64, the ceramic matrix material strongly bonds with the monolithic ceramic. Such bonding facilitates mechanical strength in the airfoil 58 as well as heat transfer through joined interfaces between the shell 64 and the liner 66. Additionally, since the shell 64 and liner 66 are bonded together at high temperature during firing and curing, having multiple shell pieces can allow for relief of residual stresses generated during the manufacturing process.

Alternatively, the liner 66 may be prefabricated and densified prior to bonding with the shell 64 and then assembled into the shell 64. A brazing material, such as but not limited to elemental silicon, may be provided at the interfaces that are to be joined. Upon heating to an appropriate brazing temperature for the selected brazing material, the brazing material diffuses and bonds the shell 64 and liner 66 together.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   an airfoil section having an airfoil wall surrounding a cavity, the airfoil wall including an exterior monolithic ceramic shell and an interior ceramic matrix composite (CMC) liner including CMC plies;
   an outermost ply of the CMC plies forming tabs that are raised from an underlying ply of the CMC plies so as to define a slot between the tabs and the underlying ply;
   the exterior monolithic ceramic shell including an underlapping shell piece and an overlapping shell piece, the underlapping shell piece having a portion disposed in the slot and bonded with the tabs, the overlapping shell piece extending over the tabs and bonded to the tabs;
   channels bounded by adjacent ones of the tabs, the underlapping shell piece, and the overlapping shell piece; and
   channel orifices through the CMC liner connecting the cavity and the channels.

2. The airfoil as recited in claim 1, wherein the overlapping shell piece includes a base portion and a tapered flange that projects from the base portion, and the tapered flange is bonded with the tabs.

3. The airfoil as recited in claim 2, wherein the base portion is bonded with the outermost ply adjacent to the tabs.

4. The airfoil as recited in claim 1, wherein the underlapping shell piece includes a base portion and a tapered flange that projects from the base portion, and the tapered flange is bonded with the tabs.

5. The airfoil as recited in claim 4, wherein the base portion is bonded with the CMC liner.

6. The airfoil as recited in claim 1, wherein the overlapping shell piece and the underlapping shell piece each include a base portion and a tapered flange that projects from the base portion, the tapered flange of the underlapping shell piece is bonded with an inner surface of the tabs, and the tapered flange of the overlapping shell piece is bonded with an outer surface of the tabs.

7. The airfoil as recited in claim 1, wherein the tabs are axially elongated.

8. The airfoil as recited in claim 7, wherein the tabs are arranged in a radial row.

9. The airfoil as recited in claim 1, wherein the channels each have a sloped outlet section.

10. The airfoil as recited in claim 1, wherein the overlapping shell piece is a first overlapping shell piece, the monolithic ceramic shell includes a second, adjacent overlapping shell piece, the first overlapping shell piece has a first side edge, the second overlapping shell piece has a second side edge, the first and second side edges define sides of an elongated trench, the CMC liner defines a floor of the trench, and the floor includes trench orifices through the CMC liner connecting the cavity and the trench.

11. An airfoil comprising:
    an airfoil section having an airfoil wall surrounding a cavity, the airfoil wall including an exterior monolithic ceramic shell and an interior ceramic matrix composite (CMC) liner including CMC plies;
    an outermost ply of the CMC plies forming a tab that is raised from an underlying ply of the CMC plies;
    the exterior monolithic ceramic shell including shell pieces with respective flanges that overlap each other with the tab being situated between the flanges, the tab being bonded with the flanges so as to secure the flanges together.

12. The airfoil as recited in claim 11, wherein the tab includes a base portion that projects outwards from the underlying ply and a body portion that projects off of the base portion along the underlying ply.

13. The airfoil as recited in claim 12, wherein the tab includes a tip portion that projects off of the body portion away from the underlying ply.

14. The airfoil as recited in claim 11, wherein the tab is a single one of the CMC plies.

15. An airfoil comprising:
    an airfoil section having an airfoil wall surrounding a cavity, the airfoil wall including an exterior monolithic ceramic shell and an interior ceramic matrix composite (CMC) liner, the CMC liner having an outermost ply having an outer ply surface that faces an interior surface of the exterior monolithic ceramic shell, the outer ply surface of the outermost ply being bonded to the interior surface of the exterior monolithic ceramic shell, the exterior monolithic ceramic shell including a first shell piece having a first side edge and a second shell piece having a second side edge, the first side edge being located opposite the second side edge so as to define and second sides of a radially elongated trench and the CMC liner defining a floor of the trench, the floor including a plurality of orifices through the CMC liner connecting the cavity and the trench.

16. The airfoil as recited in claim 15, wherein at least the first side edge defines an exterior sloped lip of the trench.

17. The airfoil as recited in claim 15, wherein at least a portion of the orifices are sloped radially outwards.

18. The airfoil as recited in claim 15, wherein the CMC liner includes CMC plies, an outermost ply of the CMC plies forms tabs that are raised from an underlying ply of the CMC plies so as to define a slot between the tabs and the underlying ply, the exterior monolithic ceramic shell includes an underlapping shell piece that has a portion disposed in the slot and that is bonded with the tabs, and the first shell piece extends over the tabs and is bonded to the tabs.

19. The airfoil as recited in claim 15, wherein the trench includes an open face opposite the floor.

* * * * *